(12) United States Patent
Heap et al.

(10) Patent No.: US 8,067,908 B2
(45) Date of Patent: Nov. 29, 2011

(54) METHOD FOR ELECTRIC POWER BOOSTING IN A POWERTRAIN SYSTEM

(75) Inventors: Anthony H. Heap, Ann Arbor, MI (US); Goro Tamai, West Bloomfield, MI (US); Scott J Thompson, Waterford, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 549 days.

(21) Appl. No.: 12/255,815

(22) Filed: Oct. 22, 2008

(65) Prior Publication Data
US 2009/0115354 A1 May 7, 2009

Related U.S. Application Data

(60) Provisional application No. 60/985,272, filed on Nov. 4, 2007.

(51) Int. Cl.
*H02P 1/00* (2006.01)
(52) U.S. Cl. .......... 318/139; 318/812; 318/727
(58) Field of Classification Search .......... 318/139, 318/812, 727, 432, 376, 8; 701/99; 180/65.285
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |

(Continued)

FOREIGN PATENT DOCUMENTS

DE 102005044268 A1 3/2007

(Continued)

*Primary Examiner* — Karen Masih

(57) ABSTRACT

A powertrain system is operative to transfer power between an input member and a plurality of power actuators and an output member to generate an output torque. The power actuators are connected to an energy storage device. A method for controlling the powertrain system includes monitoring operating conditions of the powertrain system, determining an electric power limit for output power of the energy storage device, selectively enabling electric power boost based upon the operating conditions of the powertrain system, and increasing the electric power limit when electric power boost is enabled.

20 Claims, 7 Drawing Sheets

U.S. PATENT DOCUMENTS

| | | |
|---|---|---|
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0121448 A1* | 5/2008 | Betz et al. .................... 180/65.3 |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |

| | | |
|---|---|---|
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

| | | |
|---|---|---|
| WO | WO-2004030970 A2 | 4/2004 |
| WO | WO-2005118332 A1 | 12/2005 |
| WO | WO-2007072175 A1 | 6/2007 |

* cited by examiner

US 8,067,908 B2

METHOD FOR ELECTRIC POWER BOOSTING IN A POWERTRAIN SYSTEM

CROSS REFERENCE TO RELATED APPLICATION

This application claims the benefit of U.S. Provisional Application No. 60/985,272, filed on Nov. 4, 2007 which is hereby incorporated herein by reference.

TECHNICAL FIELD

This disclosure is related to managing electric power within powertrain systems.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system is operative to transfer power between an input member and a plurality of power actuators and an output member to generate an output torque. The power actuators are connected to an energy storage device. A method for controlling the powertrain system includes monitoring operating conditions of the powertrain system, determining an electric power limit for output power of the energy storage device, selectively enabling electric power boost based upon the operating conditions of the powertrain system, and increasing the electric power limit when electric power boost is enabled.

BRIEF DESCRIPTION OF THE DRAWINGS

One or more embodiments will now be described, by way of example, with reference to the accompanying drawings, in which.

DETAILED DESCRIPTION

Figure 1:
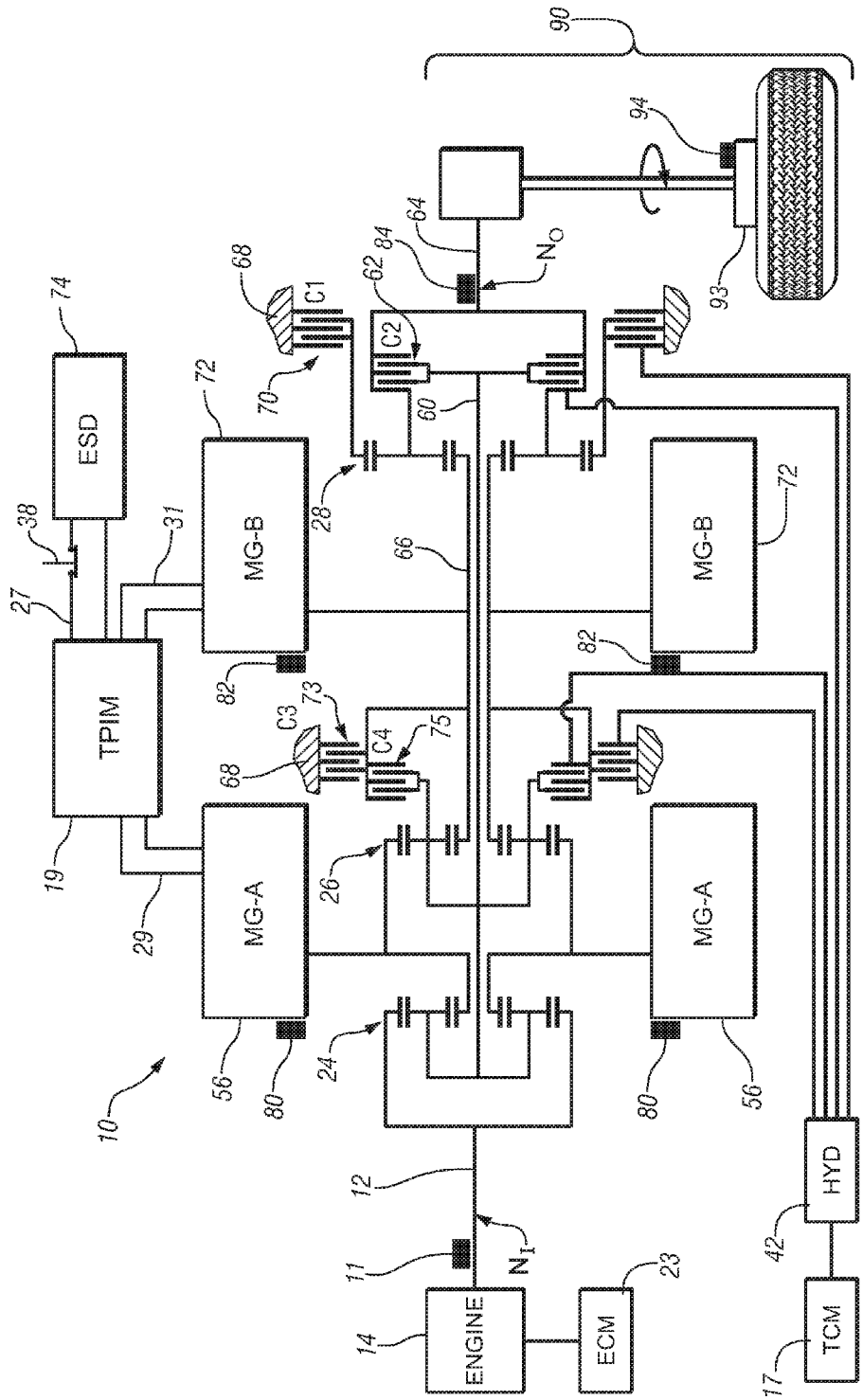
FIG. 1 is a schematic diagram of an exemplary powertrain, in accordance with the present disclosure.
Figure 2:
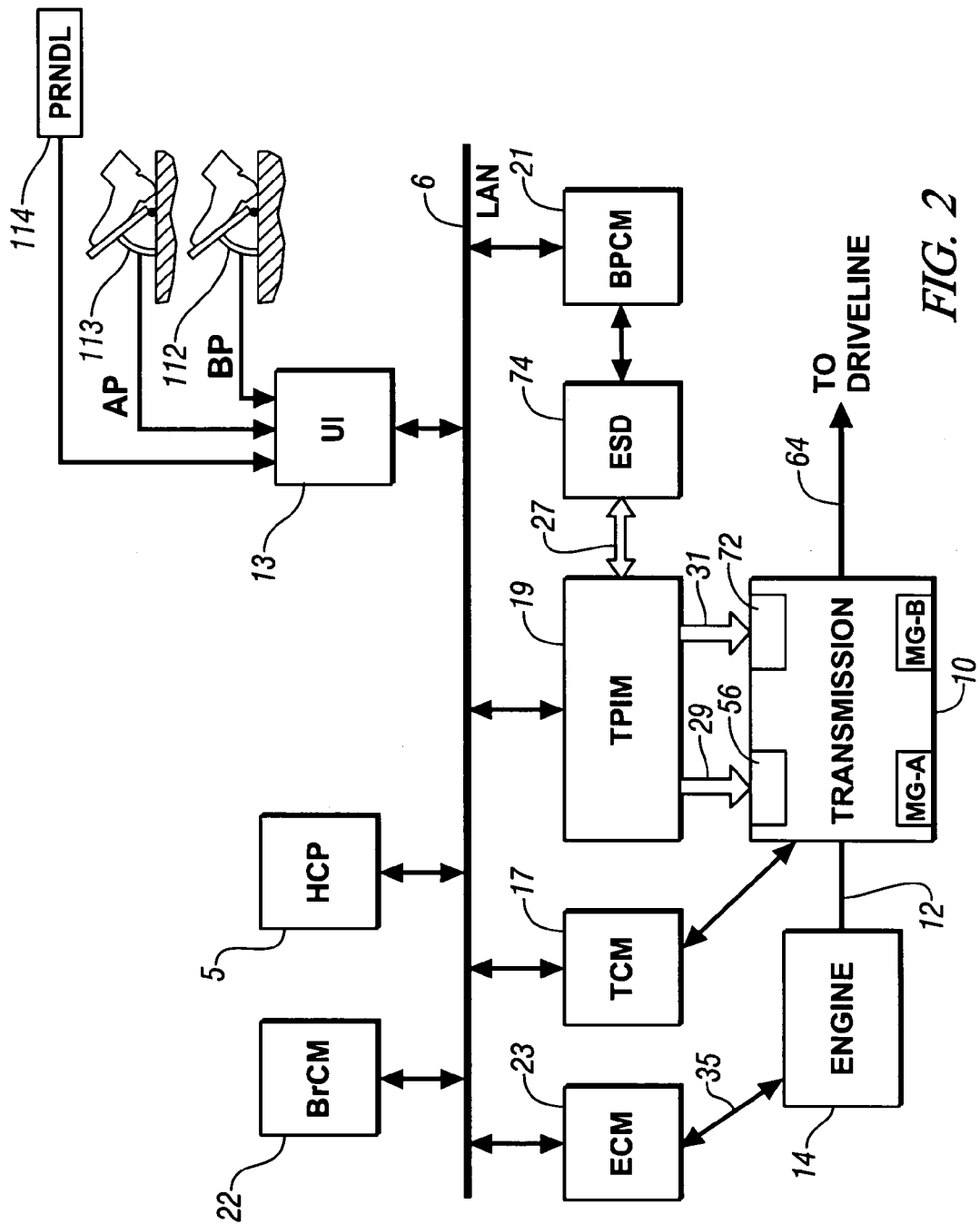
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state-of-charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
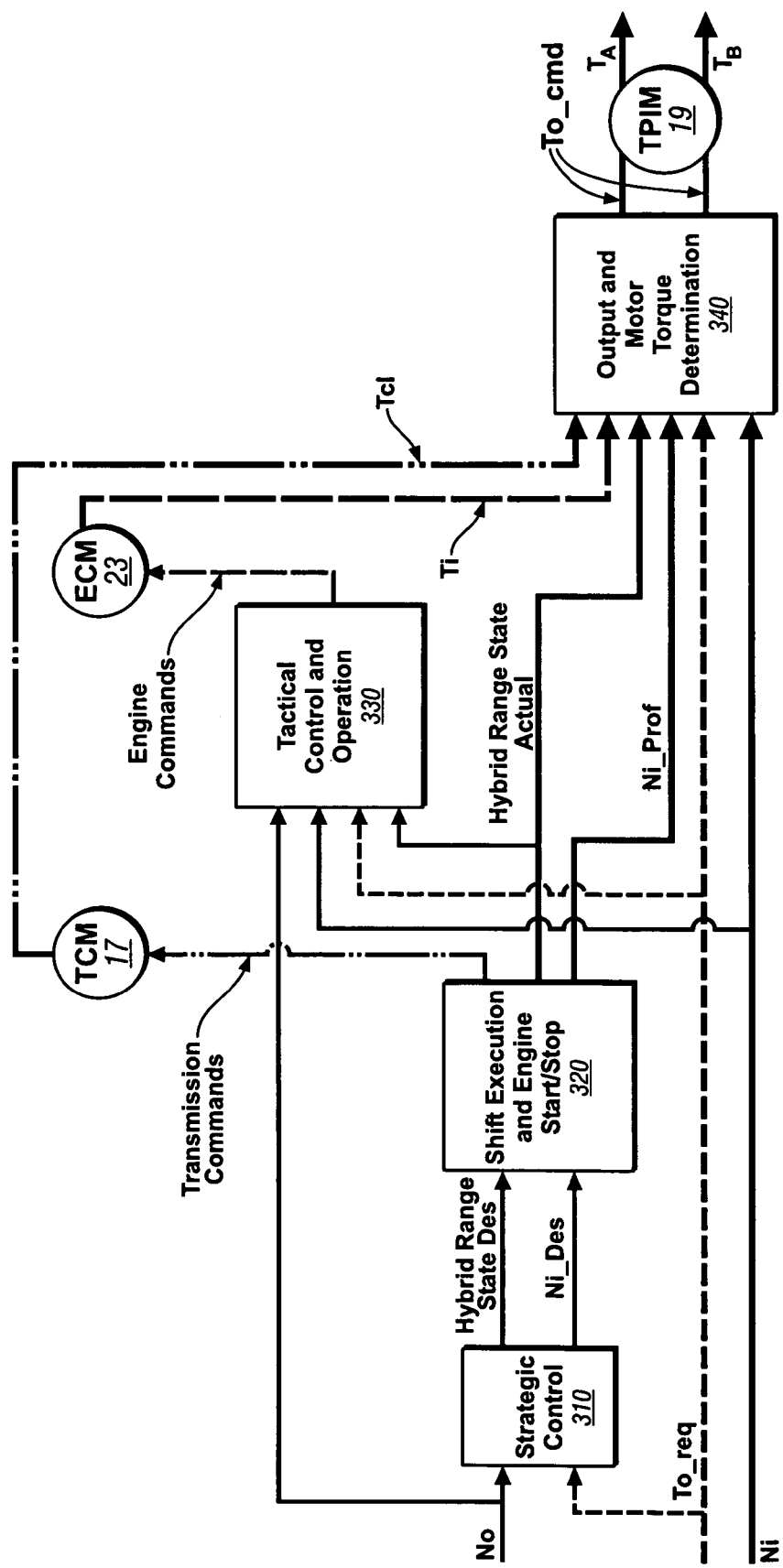
FIG. 3 is a schematic flow diagram of a control system architecture for controlling and managing torque in a powertrain system, in accordance with the present disclosure.

FIG. 3 details the system for controlling and managing torque and power flow in a powertrain system having multiple torque generative devices, described with reference to the hybrid powertrain system of FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 3 depicts a flow of pertinent signals through the control modules. In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('Tcl') for each clutch is estimated in the TCM 17, including the presently applied clutches and the non-applied clutches, and a present engine input torque ('Ti') reacting with the input member 12 is determined in the ECM 23. An output and motor torque determination scheme ('Output and Motor Torque Determination') 340 is executed to determine the preferred output torque from the powertrain ('To_cmd'), which includes motor torque commands ('$T_A$' and '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 and thence to the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Preferably, forwardly propelling the vehicle results in vehicle forward acceleration so long as the output torque is sufficient to overcome external loads on the vehicle, e.g., due to road grade, aerodynamic loads, and other loads.

In operation, operator inputs to the accelerator pedal 113 and to the brake pedal 112 are monitored to determine the operator torque request. Present speeds of the output member 64 and the input member 12, i.e., No and Ni, are determined. A present operating range state of the transmission 14 and present engine states are determined. Maximum and minimum electric power limits of the electric energy storage device 74 are determined.

Blended brake torque includes a combination of the friction braking torque generated at the wheels 93 and the output torque generated at the output member 64 which reacts with the driveline 90 to decelerate the vehicle in response to the operator input to the brake pedal 112.

The BrCM 22 commands the friction brakes on the wheels 93 to apply braking force and generates a command for the transmission 10 to create a change in output torque which reacts with the driveline 90 in response to a net operator input to the brake pedal 112 and the accelerator pedal 113. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electromechanical transmission 10 and the engine 14. The negative output torque reacted through the electromechanical transmission 10 can be transferred to the first and second electric machines 56 and 72 to generate electric power for storage in the ESD 74.

The operator inputs to the accelerator pedal 113 and the brake pedal 112 together with torque intervention controls comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction, and a similar reverse propulsion response when the vehicle operation is commanded in the reverse direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system.

The immediate accelerator output torque request comprises an immediate torque request determined based upon the operator input to the accelerator pedal 113 and torque intervention controls. The control system controls the output torque from the hybrid powertrain system in response to the immediate accelerator output torque request to cause positive acceleration of the vehicle. The immediate brake output torque request comprises an immediate braking request determined based upon the operator input to the brake pedal 112 and torque intervention controls. The control system controls the output torque from the hybrid powertrain system in response to the immediate brake output torque request to cause deceleration of the vehicle. Vehicle deceleration effected by control of the output torque from the hybrid powertrain system is combined with vehicle deceleration effected by a vehicle braking system (not shown) to decelerate the vehicle to achieve the operator braking request.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request may be modified by torque intervention controls based on events that affect vehicle operation outside the powertrain control. Such events include vehicle level interruptions in the powertrain control for antilock braking, traction control and vehicle stability control, which can be used to modify the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when torque intervention controls is not being commanded. When torque intervention, e.g., any one of antilock braking, traction control or vehicle stability, is being is commanded, the predicted accelerator output torque request can remain the preferred output torque with the immediate accelerator output torque request being decreased in response to output torque commands related to the torque intervention.

The immediate brake output torque request and the predicted brake output torque request are both blended brake torque requests. Blended brake torque includes a combination of the friction braking torque generated at the wheels 93 and the output torque generated at the output member 64 which reacts with the driveline 90 to decelerate the vehicle in response to the operator input to the brake pedal 112.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The immediate brake output torque request is determined based upon the operator input to the brake pedal 112, and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state or an inactive state. When the commanded axle torque response type is an active state, the output torque command is the immediate output torque. Preferably the torque response for this response type is as fast as possible.

The predicted accelerator output torque request and the predicted brake output torque request are input to the strategic optimization control scheme ('Strategic Control') 310. The strategic optimization control scheme 310 determines a desired operating range state for the transmission 10 ('Hybrid Range State Des') and a desired input speed from the engine 14 to the transmission 10 ('Ni Des'), which comprise inputs to the shift execution and engine operating state control scheme ('Shift Execution and Engine Start/Stop') 320.

A change in the input torque from the engine 14 which reacts with the input member from the transmission 10 can be effected by changing mass of intake air to the engine 14 by controlling position of an engine throttle utilizing an electronic throttle control system (not shown), including opening the engine throttle to increase engine torque and closing the engine throttle to decrease engine torque. Changes in the input torque from the engine 14 can be effected by adjusting ignition timing, including retarding spark timing from a mean-best-torque spark timing to decrease engine torque. The engine state can be changed between the engine-off state and the engine-on state to effect a change in the input torque. The engine state can be changed between the all-cylinder operating state and the cylinder deactivation operating state, wherein a portion of the engine cylinders are unfueled. The engine state can be changed by selectively operating the engine 14 in one of the fueled state and the fuel cutoff state wherein the engine is rotating and unfueled. Executing a shift in the transmission 10 from a first operating range state to a second operating range state can be commanded and achieved by selectively applying and deactivating the clutches C1 70, C2 62, C3 73, and C4 75.

The immediate accelerator output torque request, the predicted accelerator output torque request, the immediate brake output torque request, the predicted brake output torque request, and the axle torque response type are inputs to the tactical control and operation scheme 330 to determine the engine command comprising the preferred input torque to the engine 14.

The tactical control and operation scheme 330 can be divided into two parts. This includes determining a desired engine torque, and therefore a power split between the engine 14 and the first and second electric machines 56 and 72, and controlling the engine states and operation of the engine 14 to meet the desired engine torque. The engine states include the all-cylinder state and the cylinder deactivation state, and a fueled state and a deceleration fuel cutoff state for the present operating range state and the present engine speed. The tactical control and operation scheme 330 monitors the predicted accelerator output torque request and the predicted brake output torque request to determine the predicted input torque request. The immediate accelerator output torque request and the immediate brake output torque request are used to control the engine speed/load operating point to respond to operator inputs to the accelerator pedal 113 and the brake pedal 112, e.g., to determine the engine command comprising the preferred input torque to the engine 14. Preferably, a rapid change in the preferred input torque to the engine 14 occurs only when the first and second electric machines 56 and 72 cannot meet the operator torque request.

The immediate accelerator output torque request, the immediate brake output torque request, and the axle torque response type are input to the motor torque control scheme ('Output and Motor Torque Determination') 340. The motor torque control scheme 340 executes to determine the motor torque commands during each iteration of one of the loop cycles, preferably the 6.25 ms loop cycle.

The present input torque ('Ti') from the engine 14 and the estimated clutch torque(s) ('Tcl') are input to the motor torque control scheme 340. The axle torque response type signal determines the torque response characteristics of the output torque command delivered to the output member 64 and hence to the driveline 90.

The motor torque control scheme 340 controls motor torque commands of the first and second electric machines 56 and 72 to transfer a net commanded output torque to the output member 64 of the transmission 10 that meets the operator torque request. The control system architecture controls power flow among power actuators within a hybrid powertrain. The hybrid powertrain utilizes two or more power actuators to provide output power to an output member. Controlling power flow among the power actuators includes controlling the input speed $N_I$ from the engine 14, the input torque $T_I$ from the engine, and the motor torques $T_A$, $T_B$ of the first and second electric machines 56, 72. Although in the exemplary embodiment described herein above, the hybrid powertrain utilizes the control system architecture to control power flow among power actuators including the engine 14, the ESD 74 and the first and second electric machines 56 and 72, in alternate embodiments the control system architecture can control power flow among other types of power actuators. Exemplary power actuators that can be utilized include fuel cells, ultra-capacitors and hydraulic actuators.

The control system architecture manages electric power within the exemplary powertrain system utilizing electric power limits. This includes monitoring voltage ('$V_{BAT}$') and power ('$P_{BAT}$') of the ESD 74. The control system architecture utilizes a method for managing electric power within the powertrain system that includes establishing predicted electric power limits, long-term electric power limits, short-term electric power limits, and voltage-based electric power limits. The method further includes determining a preferred input speed from the engine 14, a preferred input torque from the engine 14, a preferred engine state, and a preferred operating range state of the transmission 10 utilizing the predicted electric power limits. The method further includes determining input torque constraints for constraining input torque from the engine 14 and output torque constraints for constraining output torque $T_O$ to the output member 64 based upon the long-term electric power limits and the short-term electric power limits. By constraining the output torque $T_O$, a total motor torque $T_M$, consisting of first and second motor torques $T_A$ and $T_B$ of the first and second electric machines 56 and 72, respectively, is also constrained based on the set of output torque constraints and the input torque $T_I$ from the engine 14. In an alternate embodiment, a set of total motor torque constraints can be determined based upon the long-term electric power limits and short-term electric power limits, in addition to, or instead of the set of output torque constraints. The method further includes determining output torque constraints based upon the voltage-based electric power limits.

The predicted electric power limits comprise preferred battery output levels associated with preferred ESD 74 performance levels, that is, the predicted electric power limits prescribe the desired operating envelope of the ESD 74. The predicted electric power limits comprise a range of battery output power levels from a minimum predicted electric power limit ('$P_{BAT\_MIN\_PRDTD}$') to a maximum predicted electric power limit ('$P_{BAT\_MAX\_PRDTD}$'). The predicted electric power limits can comprise a more constrained range of battery output power levels than the long-term electric power limits and the short-term electric power limits.

The long-term electric power limits comprise battery output power levels associated with operation of the ESD 74 while maintaining long-term durability of the ESD 74. Operation of the ESD 74 outside the long-term electric power limits for extended periods of time may reduce the operational life of the ESD 74. In one embodiment, the ESD 74 is maintained within the long-term electric power limits during steady-state operation, that is, operation not associated with transient operation. Exemplary transient operations include tip-in and tip-out of the accelerator pedal 113, wherein transient acceleration operation is requested. Maintaining the ESD 74 within the long-term electric power limits, allows the ESD 74 to provide functionality such as delivering a highest power level that does not degrade operational life of the ESD 74. The long-term electric power limits comprise a range of battery output power levels from a minimum long-term electric power limit ('$P_{BAT\_MIN\_LT}$') to a maximum long-term electric power limit ('$P_{BAT\_MAX\_LT}$'). The long-term electric power limits can comprise a more constrained range of battery output power levels than the short-term electric power limits.

The short-term electric power limits comprise ESD 74 output power levels associated with battery operation that does not significantly affect short-term battery durability. Operation of the ESD 74 outside the short-term electric power limits may reduce the operational life of the ESD 74. Operating the ESD 74 within the short-term electric power limits, but outside the long-term electric power limits for short periods of time, may minimally reduce the operational life of the ESD 74, however, does not result in large amounts of degraded operational performance to the ESD 74. In one embodiment, the ESD 74 is maintained within the short-term electric power limits during transient operation. The short-term electric power limits comprise a range of battery output power levels from a minimum short-term electric power limit ('$P_{BAT\_MIN\_ST}$') to a maximum short-term electric power limit ('$P_{BAT\_MAX\_ST}$').

The voltage-based electric power limits comprise a range of battery output power from a minimum voltage-based electric power limit ('$P_{BAT\_MAX\_VB}$') to a maximum voltage-based electric power limit ('$P_{BAT\_MAX\_VB}$') based on desired operating voltages of the ESD 74. The minimum voltage-based electric power limit $P_{BAT\_MIN\_VB}$ is a minimum amount of battery output power that the ESD 74 outputs before reaching a maximum voltage $V_{BAT\_MAX\_BASE}$. The maximum voltage-based electric power limit $P_{BAT\_MAX\_VB}$ is an estimated amount battery output power from the ESD 74 before reaching a minimum voltage $V_{BAT\_MIN\_BASE}$. The minimum voltage $V_{BAT\_MIN\_BASE}$ is a minimum permissible voltage for operating the battery without significantly affecting short-term battery durability. Outputting power from the ESD 74 when the voltage levels of the ESD 74 are below the minimum $V_{BAT\_MIN\_BASE}$ can cause degraded operational life of the ESD 74.

The tactical control scheme 330 determines a set of tactical control electric power constraints based upon the short-term electric power limits and the long-term electric power limits. In particular, the tactical control scheme 330 sets the tactical control electric power constraints to the long-term electric power limits, when the battery output power of the ESD 74 is within a preferred tactical control battery output power operating range, wherein the preferred tactical control battery output power operating range is defined based upon the short-term electric power limits. When the battery output power is outside the preferred tactical control battery output power operating range, the tactical control scheme 330 utilizes feedback control based upon the battery output power and the short-term electric power limits to modify the tactical control electric power constraints to control battery output power PBAT within the preferred tactical control battery output power operating range.

The set of tactical control electric power constraints are utilized to determine a set of input torque constraints for the tactical control scheme 330. When the preferred input torque as determined by the optimization function is within the set of input torque constraints, the tactical control scheme 330 requests the preferred input torque from the engine 14, and the engine 14 controls the input torque $T_I$ to the preferred input torque, e.g., by adjusting engine fueling and/or adjusting position of an engine throttle. When the preferred input torque is outside the set of input torque constraints, the tactical control scheme requests the violated constraint for input torque from the engine 14, and the engine 14 adjusts combustion timing to control input torque within the input torque constraints.

Figure 4:
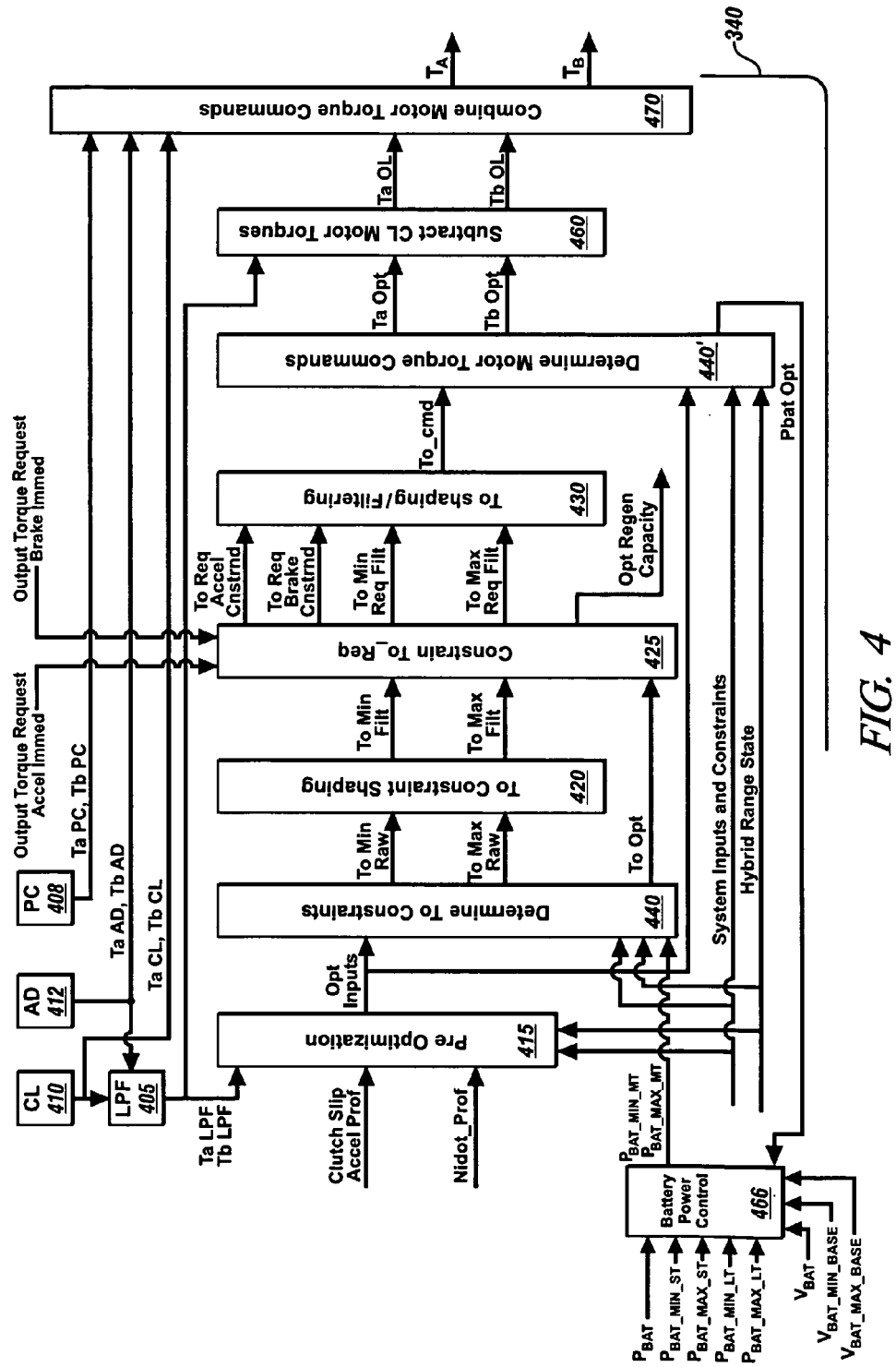
FIGS. 4, 5, and 6 are flow diagrams of exemplary control schemes, in accordance with the present disclosure.

FIG. 4 details signal flow for the output and motor torque determination scheme 340 for controlling and managing the output torque through the first and second electric machines 56 and 72, described with reference to the hybrid powertrain system of FIGS. 1 and 2 and the control system architecture of FIG. 3 and constraints include the maximum and minimum available battery power limits ('Pbat Min/Max'). The output and motor torque determination scheme 340 controls the motor torque commands of the first and second electric machines 56 and 72 to transfer a net output torque to the output member 64 of the transmission 10 that reacts with the driveline 90 and meets the operator torque request, subject to constraints and shaping. The output and motor torque determination scheme 340 preferably includes algorithmic code and predetermined calibration code which is regularly executed during the 6.25 ms and 12.5 ms loop cycles to determine preferred motor torque commands ('$T_A$', '$T_B$') for controlling the first and second electric machines 56 and 72 in this embodiment.

The output and motor torque determination scheme 340 determines and uses a plurality of inputs to determine constraints on the output torque, from which it determines the output torque command ('To_cmd'). Motor torque commands ('$T_A$', '$T_B$') for the first and second electric machines 56 and 72 can be determined based upon the output torque command. The inputs to the output and motor torque determination scheme 340 include operator inputs, powertrain system inputs and constraints, and autonomic control inputs.

The operator inputs include the immediate accelerator output torque request ('Output Torque Request Accel Immed') and the immediate brake output torque request ('Output Torque Request Brake Immed').

The autonomic control inputs include torque offsets to effect active damping of the driveline 90 (412), to effect engine pulse cancellation (408), and to effect a closed loop correction based upon the input and output speeds (410). The torque offsets for the first and second electric machines 56 and 72 to effect active damping of the driveline 90 can be determined ('Ta AD', 'Tb AD'), e.g., to manage and effect driveline lash adjustment, and are output from an active damping algorithm ('AD') (412). The torque offsets to effect engine pulse cancellation ('Ta PC', 'Tb PC') are determined during starting and stopping of the engine during transitions between the engine-on state ('ON') and the engine-off state ('OFF') to cancel engine torque disturbances, and are output from a pulse cancellation algorithm ('PC') (408). The torque offsets for the first and second electric machines 56 and 72 to effect closed-loop correction torque are determined by monitoring input speed to the transmission 10 and clutch slip speeds of clutches C1 70, C2 62, C3 73, and C4 75. When operating in one of the mode operating range states, the closed-loop correction torque offsets for the first and second electric machines 56 and 72 ('Ta CL', 'Tb CL') can be determined based upon a difference between the input speed from sensor 11 ('Ni') and the input speed profile ('Ni_Prof'). When operating in Neutral, the closed-loop correction is based upon the difference between the input speed from sensor 11 ('Ni') and the input speed profile ('Ni_Prof'), and a difference between a clutch slip speed and a targeted clutch slip speed, e.g., a clutch slip speed profile for a targeted clutch C1 70. The closed-loop correction torque offsets are output from a closed loop control algorithm ('CL') (410). Clutch torque(s) ('Tcl') comprising clutch reactive torque range(s) for the applied torque transfer clutch(es), and unprocessed clutch slip speeds and clutch slip accelerations of the non-applied clutches can be determined for the specific operating range state for any of the presently applied and non-locked clutches. The closed-loop motor torque offsets and the motor torque offsets to effect active damping of the driveline 90 are input to a low pass filter to determine motor torque corrections for the first and second electric machines 56 and 72 ('$T_A$ LPF' and $T_B$ LPF') (405).

A battery power control function ('Battery Power Control') 466 monitors battery power inputs to determine electric power constraints comprising a maximum motor torque control electric power constraint ('$P_{BAT\_MAX\_MT}$') and a minimum motor torque control electric power constraint ('$P_{BAT\_MIN\_MT}$') that is input to an optimization algorithm 440 to determine minimum and maximum raw output torque constraints ('To Min Raw', 'To Max Raw'). Inputs to the battery power control function 466 include battery voltage ('$V_{BAT}$'), battery power ('$P_{BAT}$'), the maximum voltage $V_{BAT\_MAX\_BASE}$, the minimum voltage $V_{BAT\_MIN\_BASE}$, a maximum long-term electric power limit ('$P_{BAT\_MAX\_LT}$'), a minimum long-term electric power limit ('$P_{BAT\_MIN\_LT}$'), a maximum short term electric power limit ('$P_{BAT\_MAX\_ST}$'), and minimum short term electric power limit ('$P_{BAT\_MIN\_ST}$').

Other system inputs include the operating range state ('Hybrid Range State') and a plurality of system inputs and constraints ('System Inputs and Constraints'). The system inputs can include scalar parameters specific to the powertrain system and the operating range state, and can be related to speed and acceleration of the input member 12, output member 64, and the clutches. Other system inputs are related to system inertias, damping, and electric/mechanical power conversion efficiencies in this embodiment. The constraints include maximum and minimum motor torque outputs from the torque machines, i.e., first and second electric machines 56 and 72 ('Ta Min/Max', 'Tb Min/Max'), and maximum and minimum clutch reactive torques for the applied clutches. Other system inputs include the input torque, clutch slip speeds and other relevant states.

Inputs including an input acceleration profile ('Nidot_Prof') and a clutch slip acceleration profile ('Clutch Slip Accel Prof') are input to a pre-optimization algorithm (415), along with the system inputs, the operating range state, and the motor torque corrections for the first and second electric machines 56 and 72 ('$T_A$ LPF' and '$T_B$ LPF'). The input acceleration profile is an estimate of an upcoming input acceleration that preferably comprises a targeted input acceleration for the forthcoming loop cycle. The clutch slip acceleration profile is an estimate of upcoming clutch acceleration for one or more of the non-applied clutches, and preferably comprises a targeted clutch slip acceleration for the forthcoming loop cycle. Optimization inputs ('Opt Inputs'), which can include values for motor torques, clutch torques and output torques can be calculated for the present operating range state and used in an optimization algorithm to determine the maximum and minimum raw output torque constraints (440) and to determine the preferred split of open-loop torque commands between the first and second electric machines 56 and 72 (440'). The optimization inputs, the maximum and minimum battery power limits, the system inputs and the present operating range state are analyzed to determine a preferred or optimum output torque ('To Opt') and minimum and maximum raw output torque constraints ('To Min Raw', 'To Max Raw') (440), which can be shaped and filtered (420). The preferred output torque ('To Opt') comprises an output torque that minimizes battery power subject to the operator torque request. The immediate accelerator output torque request and the immediate brake output torque request are each shaped and filtered and subjected to the minimum and maximum output torque constraints ('To Min Filt', 'To Max Filt') to determine minimum and maximum filtered output torque request constraints ('To Min Req Filtd', 'To Max Req Filtd'). A constrained accelerator output torque request ('To Req Accel Cnstrnd') and a constrained brake output torque request ('To Req Brake Cnstrnd') can be determined based upon the minimum and maximum filtered output torque request constraints (425).

Furthermore, a regenerative braking capacity ('Opt Regen Capacity') of the transmission 10 comprises a capacity of the transmission 10 to react driveline torque, and can be determined based upon constraints including maximum and minimum motor torque outputs from the torque machines and maximum and minimum reactive torques for the applied clutches, taking into account the battery power limits. The regenerative braking capacity establishes a maximum value for the immediate brake output torque request. The regenerative braking capacity is determined based upon a difference between the constrained accelerator output torque request and the preferred output torque. The constrained accelerator output torque request is shaped and filtered and combined with the constrained brake output torque request to determine a net output torque command. The net output torque command is compared to the minimum and maximum request filtered output torques to determine the output torque command ('To_cmd') (430). When the net output torque command is between the maximum and minimum request filtered output torques, the output torque command is set to the net output torque command. When the net output torque command exceeds the maximum request filtered output torque, the output torque command is set to the maximum request filtered output torque. When the net output torque command is less than the minimum request filtered output torque, the output torque command is set to the minimum request filtered output torque command.

Powertrain operation is monitored and combined with the output torque command to determine a preferred split of open-loop torque commands between the first and second electric machines 56 and 72 that meets reactive clutch torque capacities ('$T_A$ Opt' and '$T_B$ Opt'), and provide feedback related to the preferred battery power ('Pbat Opt') (440'). The motor torque corrections for the first and second electric machines 56 and 72 ('$T_A$ LPF' and $T_B$ LPF') are subtracted to determine open loop motor torque commands ('$T_A$ OL' and '$T_B$ OL') (460).

The open loop motor torque commands are combined with the autonomic control inputs including the torque offsets to effect active damping of the driveline 90 (412), to effect engine pulse cancellation (408), and to effect a closed loop correction based upon the input and clutch slip speeds (410), to determine the motor torques $T_A$ and $T_B$ for controlling the first and second electric machines 56 and 72 (470). The aforementioned steps of constraining, shaping and filtering the output torque request to determine the output torque command which is converted into the torque commands for the first and second electric machines 56 and 72 is preferably a feed-forward operation which acts upon the inputs and uses algorithmic code to calculate the torque commands.

The system operation as configured leads to determining output torque constraints based upon present operation and constraints of the powertrain system. The operator torque request is determined based upon operator inputs to the brake pedal and to the accelerator pedal. The operator torque request can be constrained, shaped and filtered to determine the output torque command, including determining a preferred regenerative braking capacity. An output torque command can be determined that is constrained based upon the constraints and the operator torque request. The output torque command is implemented by commanding operation of the torque machines. The system operation effects powertrain operation that is responsive to the operator torque request and within system constraints. The system operation results in an output torque shaped with reference to operator drivability demands, including smooth operation during regenerative braking operation.

The optimization algorithm (440, 440') comprises an algorithm executed to determine powertrain system control parameters that are responsive to the operator torque request that minimizes battery power consumption. The optimization algorithm 440 includes monitoring present operating conditions of the electromechanical hybrid powertrain, e.g., the powertrain system described hereinabove, based upon the system inputs and constraints, the present operating range state, and the available battery power limits. For a candidate input torque, the optimization algorithm 440 calculates powertrain system outputs that are responsive to the system inputs comprising the aforementioned output torque commands and are within the maximum and minimum motor torque outputs from the first and second electric machines 56 and 72, and within the available battery power, and within the range of clutch reactive torques from the applied clutches for the present operating range state of the transmission 10, and take into account the system inertias, damping, clutch slippages, and electric/mechanical power conversion efficiencies. Preferably, the powertrain system outputs include the preferred output torque ('To Opt'), achievable torque outputs from the first and second electric machines 56 and 72 ('Ta Opt', 'Tb Opt') and the preferred battery power ('Pbat Opt') associated with the achievable torque outputs.

Figure 5:
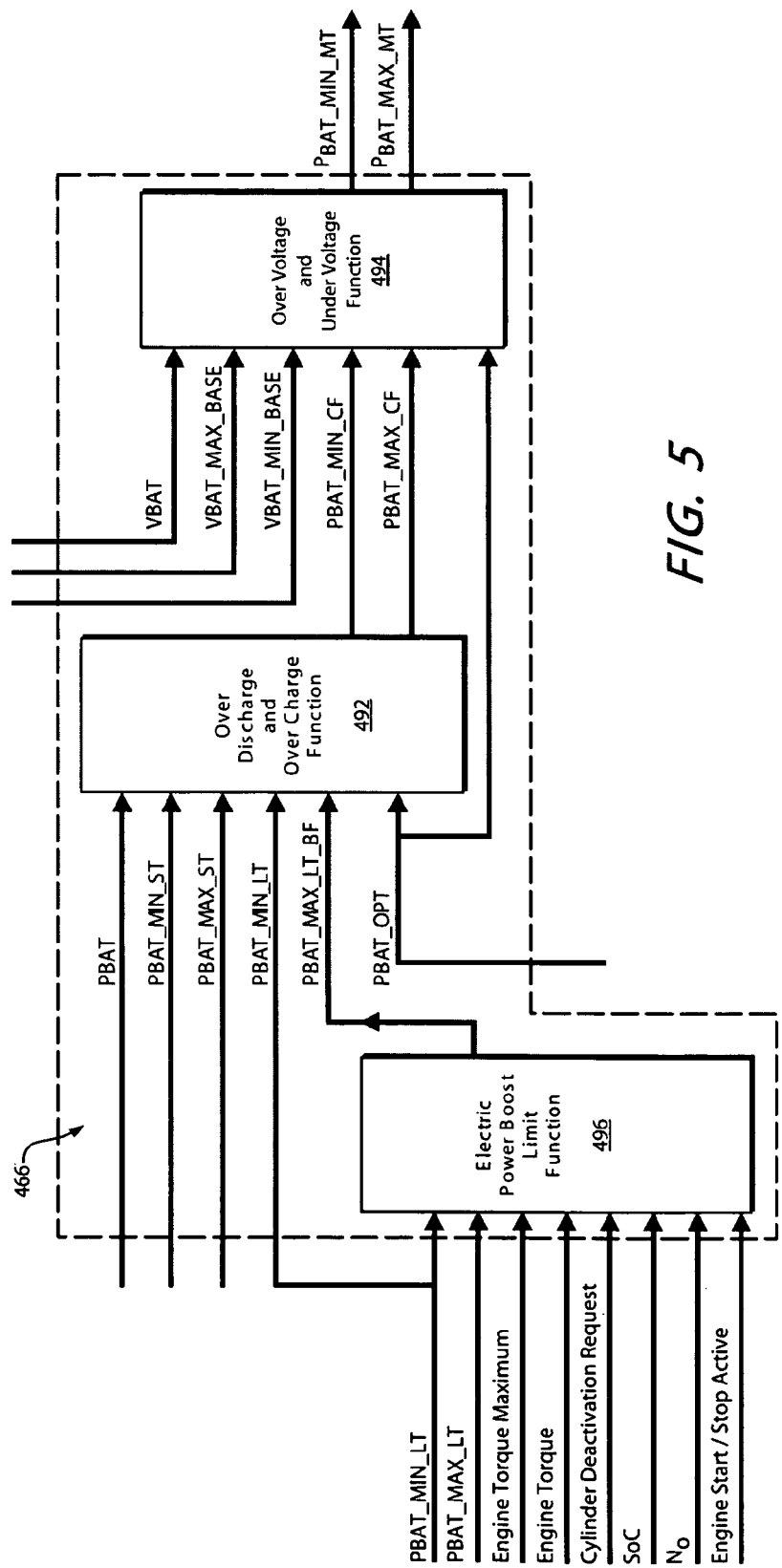

FIG. 5 shows added details of the battery power control function 466. The battery power control function 466 determines electric power constraints including the minimum motor torque control electric power constraint ('$P_{BAT\_MIN\_MT}$') and the maximum motor torque control electric power constraint ('$P_{BAT\_MAX\_MT}$'). The battery power control function 466 includes an electric power boost limit function ('Electric Power Boost Limit Function') 496, a charge function ('Over Discharge and Over Charge Function') 492 and a voltage function ('Over Voltage and Under Voltage Function') 494.

Figure 6:
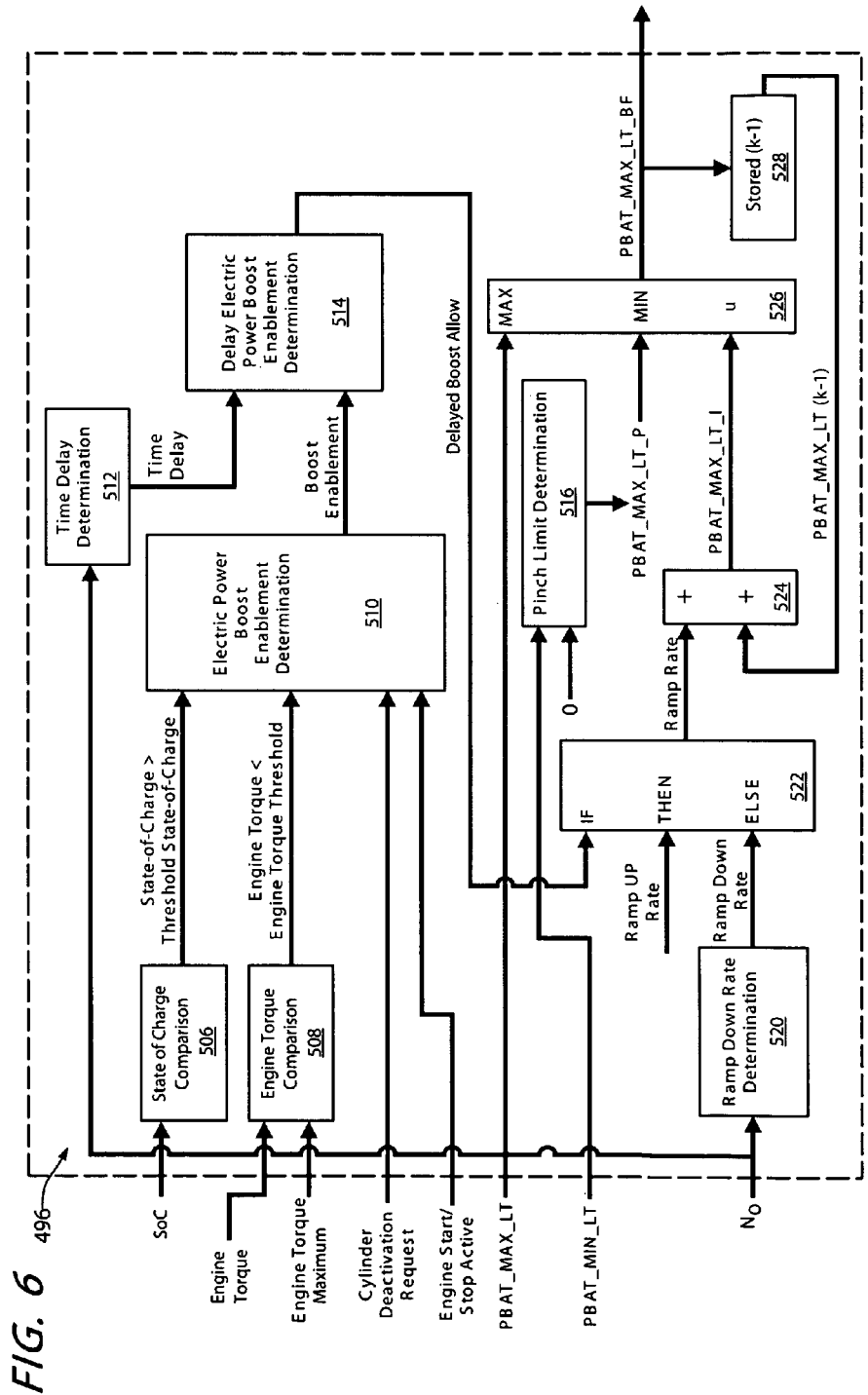
Figure 7:
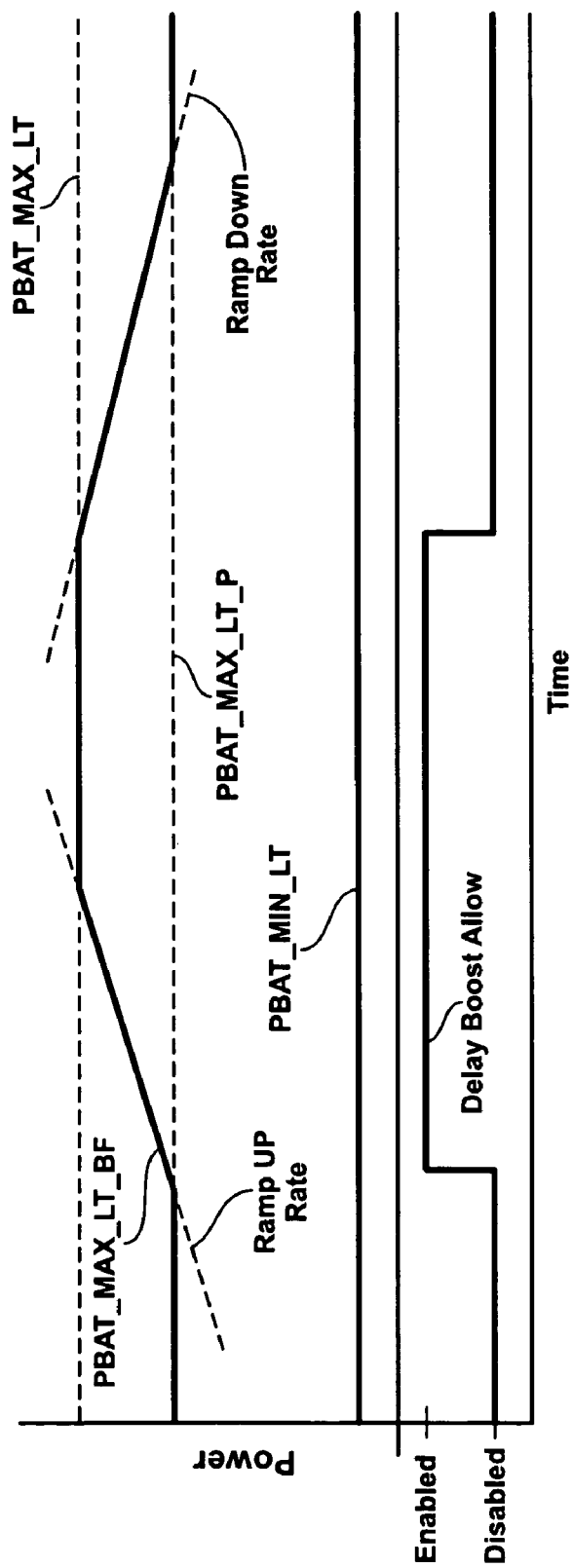
FIG. 7 is a graphical depiction of power limit values over time in accordance with the present disclosure.

FIG. 6 depicts the electric power boost limit function 496 ('Electric Power Boost Limit Function'), and FIG. 7 depicts electric power levels ('Power') of the electric power boost limit function 496 along with a delayed electric power boost signal ('Delay Boost Allow') plotted as function of elapsed time ('Time').

The electric power boost limit function 496 includes an electric power boost enablement determination function 510 ('Electric Power Boost Enablement Determination'). The electric boost enablement determination function 510 inputs signals to determine whether the powertrain system is in a state in which allowing electric power boost is desirable, for example, when energy from the energy storage device will not be drained to undesirable levels when allowing electric power boost. Signals indicating that allowing electric power boost is desirable include signals indicating that the state-of-charge of the ESD 74 is greater than a threshold state-of-charge, the cylinder deactivation engine state is requested, the engine torque is greater than the threshold engine torque, and one of the engine starting cycle and the engine stopping cycle is active.

The state-of-charge ('State-of-Charge') of the ESD 74 is monitored by the BPCM 21 and compared to a threshold state of charge in a state-of-charge comparison function ('State-of-Charge Comparison') 506. When the state-of-charge is greater than the threshold state-of-charge, the state of charge comparison function 506 outputs a boolean signal indicating that the state-of-charge of the ESD 74 is greater than the threshold state-of-charge ('State-of-Charge>Threshold State-of-Charge'). Engine torque ('Engine Torque') is monitored and compared to a threshold engine torque ('Engine Torque Maximum') using a comparison function ('Engine Torque Comparison') 508. The engine torque comparison function 508 generates a signal based on a hysteresis determination of that engine torque less than the engine torque threshold ('Engine Torque<Engine Torque Threshold'). Further, the tactical optimization function 330 outputs a signal requesting cylinder deactivation ('Cylinder Deactivation Requested') and the shift execution and engine start/stop control scheme 320 outputs a signal indicating that one of an engine starting cycle and engine stopping cycle is active ('Engine Start/Stop Active').

When the electric boost enablement determination function 510 receives at least one of the aforementioned signals indicating that allowing electric power boost is desirable, the boost enablement determination function sets an electric power boost signal ('Boost Enablement') to indicate electric power boost is enabled. When the boost enablement function 510 does not receive at least one of the signals indicating that allowing electric power boost is desirable, the electronic boost enablement determination function 510 sets the electric power boost signal to indicate electric power boost is disabled and boost limiting is desirable.

A time delay determination function ('Time Delay Determination') 512 determines a time delay ('Time Delay') based upon the output speed No of the transmission 10. A delayed electric power boost determination function ('Delay Electric Power Boost Enablement Determination') 514 determines a delayed electric power boost signal as the electric power boost signal offset by the time delay when the boost enablement signal transitions from off to on. The delayed electric boost determination function 514 determines the delayed electric boost signal as the electric boost signal when the boost enablement signal transitions from on to off.

A ramp down rate determination function ('Ramp Down Rate Determination') 520 inputs the output speed No of the transmission 10 and determines a ramp down rate ('Ramp Down Rate') that is a rate of decrease in electric power based upon the output speed $N_O$ of the transmission 10. The ramp down rate, the delayed boost signal, and a ramp up rate ('Ramp UP Rate') are provided to a decision block 522. If the delayed boost signal indicates electric power boost is enabled, the decision block 522 outputs the ramp up rate as a ramp rate ('Ramp Rate'). If the delayed boost enablement signal indicates that electric power boost is disabled, the decision block 522 outputs the ramp down rate as the ramp rate.

A summation function 524 inputs the ramp rate and modifies a boost function maximum long-term electric power limit ('PBAT_MAX_LT_BF(k−1)') at time k1 to determine an initial maximum long-term electric power limit ('PBAT_MAX_LT_I').

A pinched electric power limit determination function 516 ('Pinch Limit Determination') determines a pinched maximum long-term electric power limit ('PBAT_MAX_LT_P') as the greater of the minimum long term electric power limit ('PBAT_MIN_LT') and zero. The pinched maximum long-term electric power limit, the initial maximum long-term electric power limit, and the maximum long-term electric power limit are inputted into the boost function maximum long-term electric power limit determination function 526. If the initial long-term electric power limit is between the maximum long-term electric power limit and the pinched maximum long-term electric power limit, the boost function maximum long-term electric power limit determination function 526 sets the boost function maximum long-term electric power limit ('PBAT_MAX_LT_BF') to the initial maximum long-term electric power limit. If the initial maximum long-term electric power limit is less than the pinched maximum long-term electric power limit, the boost function maximum long-term electric power limit determination function 526 sets the boost function maximum long-term electric power limit to the pinch maximum long-term electric power limit. If the initial maximum long-term electric power limit is greater than the boost maximum long-term electric power limit, the boost function maximum long-term electric power limit determination function 526 sets the boost function maximum long-term electric power limit to the maximum long-term electric power limit. The boost function maximum long-term electric power limit is stored in one of the storage mediums ('Stored (k−1)') (528).

The charge function 492 inputs the actual battery output power ('$P_{BAT}$') of the ESD 74, the minimum short-term electric power limit ('$P_{BAT\_MIN\_ST}$'), the maximum short-term electric power limit ('$P_{BAT\_MAX\_ST}$'), the minimum long-term electric power limit ('$P_{BAT\_MIN\_LT}$'), the boost function maximum long-term electric power limit ('$P_{BAT\_MAX\_LT\_BF}$'), and the preferred battery power ('$P_{BAT\_OPT}$'). The charge function 492 outputs a minimum charge function electric power constraint ('$P_{BAT\_MIN\_CF}$') and a maximum charge function electric power constraint ('$P_{BAT\_MAX\_CF}$'). The charge function 492 determines a set of preferred electric power limits comprising an upper preferred electric power limit (not shown) and a lower preferred electric power limit (not shown) based on the short-term electric power limits.

When the actual battery output power $P_{BAT}$ of the ESD 74 is between the upper preferred electric power limit and the lower preferred electric power limit, the minimum charge function and the maximum charge function electric power constraints output from the charge function 492 comprise the minimum long-term electric power limit and the boost function maximum long-term electric power limit, respectively. When the actual battery output power $P_{BAT}$ of the ESD 74 is not between the upper and lower preferred electric power limits, the minimum charge function and the maximum charge function electric power constraints are determined in the charge function 492 based on a change rate value, the minimum long-term electric power limit, the boost function maximum long-term electric power limit, and the preferred battery power $P_{BAT\_OPT}$. The change rate value feedback control is determined when the actual battery output power $P_{BAT}$ of the ESD 74 transgresses one of the upper preferred electric power limit and the lower preferred electric power limit based upon an error between the actual battery power $P_{BAT}$ of the ESD 74 and the transgressed one of the upper preferred electric power limit and the lower preferred electric power limit.

As the charge function 492 adjusts one of the maximum charge function electric power constraint and the minimum charge function electric power constraint based on the actual battery output power $P_{BAT}$ of the ESD 74, the power constraint determination function 504 also adjusts the other charge function electric power constraint by the same amount, therefore, the difference between the maximum and minimum charge function electric power constraints remain unchanged.

The minimum and maximum charge function electric power constraints are intermediate electric power constraint values utilized to determine the final electric power constraint values, that is, the minimum motor torque control electric power constraint ('$P_{BAT\_MIN\_MT}$') and the maximum motor torque control electric power constraint ('$P_{BAT\_MAX\_MT}$').

Inputs to the voltage function 494 include actual battery voltage ('$V_{BAT}$') of the ESD 74 monitored by the BPCM 21, the minimum base voltage limit ('$V_{BAT\_MIN\_BASE}$') for the ESD 74, the maximum base voltage limit ('$V_{BAT\_MAX\_BASE}$') for the ESD 74, the charge function maximum electric power constraint ('$P_{BAT\_MAX\_CF}$'), the charge function minimum electric power constraint ('$P_{BAT\_MIN\_CF}$'), and the preferred battery power ('$P_{BAT\_OPT}$'). The minimum and maximum base voltage limits define an operating range for the voltage of the ESD 74 and can be determined based on parameters of the powertrain system including, for example, the temperature of the ESD 74.

The voltage function 494 determines a set of preferred voltage limits comprising an upper preferred voltage limit (not shown) and a lower preferred voltage limit (not shown) based on the maximum base voltage limit and the minimum base voltage limit, respectively.

When the actual battery voltage $V_{BAT}$ of the ESD 74 is between the upper preferred voltage limit and the lower voltage power limit, the voltage function 494 sets the maximum motor torque control electric power constraint ('$P_{BAT\_MAX\_MT}$') and a minimum motor torque control electric power constraint ('$P_{BAT\_MIN\_MT}$') to be the maximum charge function electric power constraint and the minimum charge function electric power constraint, respectively.

When the actual battery voltage $V_{BAT}$ of the ESD 74 is not between the upper preferred electric power limit and the lower preferred electric power limit, the voltage function 494 determines the maximum motor torque control electric power constraint ('$P_{BAT\_MAX\_MT}$') and the minimum motor torque control electric power constraint ('$P_{BAT\_MIN\_MT}$') based the actual battery voltage, the immediate battery power, and the set of preferred power limits.

The voltage function 494 determines a change rate value feedback control when the actual battery voltage $V_{BAT}$ of the ESD 74 transgresses one of the upper preferred electric power limit and the lower preferred electric power limit. The change rate value is determined based on the error between the actual battery voltage $V_{BAT}$ of the ESD 74 and the transgressed one of the upper preferred voltage limit and the lower preferred voltage limit.

The voltage function 494 adjusts only one of the maximum and minimum motor torque control electric power constraints without adjusting the other one. This affects the minimum and maximum raw output torque constraints that are output from the optimization algorithm 440, and can affect the output torque command, and the motor torque commands $T_A$ and $T_B$ for controlling the first and second electric machines 56 and 72. Furthermore, when the output torque is constrained, the range of the input torque can be reduced, which leads to a reduced permissible range for engine torque as determined by the tactical control scheme 330, again affecting the operating ranges of the motor torques $T_A$, $T_B$ of the first and second electric machines 56 and 72. The voltage function 494 provides a relatively fast correction of the maximum and minimum motor torque control electric power constraints to rapidly respond to modify the voltage of the ESD 74. The charge function 492 provides a relatively slow correction of the maximum and minimum charge function electric power constraints in order to compensate for errors in the determination of preferred battery power $P_{OPT}$.

When the electric power boost is enabled, with a corresponding increase in the maximum motor torque control electric power constraint ('$P_{BAT\_MAX\_MT}$') and/or a corresponding decrease in the minimum motor torque control electric power constraint ('$P_{BAT\_MIN\_MT}$'), the output and motor torque determination scheme 340 acts to increase motor torque commands for the first and second electric machines 56 and 72, and may correspondingly decrease input torque requirements, thus either increasing torque output from the powertrain or maintaining torque output from the powertrain at a lowered power cost.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain system operative to transfer power between an input member and a plurality of power actuators and an output member to generate an output torque, the power actuators connected to an energy storage device, the method comprising:
monitoring operating conditions of the powertrain system;
determining an electric power limit for output power of the energy storage device;
selectively enabling electric power boost based upon the operating conditions of the powertrain system; and
increasing the electric power limit when electric power boost is enabled.

2. The method of claim 1, further comprising:
selectively disabling electric power boost based upon the operating conditions of the powertrain system; and
decreasing the electric power limit when electric power boost is disabled.

3. The method of claim 1, further comprising: determining an output torque of the output member based upon the electric power limit.

4. The method of claim 1, further comprising:
determining a set of output torque constraints based upon the electric power limit, and
determining an output torque of the output member based upon the output torque constraints.

5. The method of claim 1, further comprising:
monitoring operating conditions of the powertrain system including at least one of a state of charge of the energy storage device, an engine torque, an engine capacity limit, an engine state, an engine starting cycle operation, and an engine stopping cycle operation; and
enabling electric power boost based upon at least one of the state of charge of the energy storage device, the engine state, the engine torque, the engine starting cycle, and the engine stopping cycle.

6. The method of claim 1, further comprising:
determining whether a state of charge of the energy storage device is greater than a threshold state of charge; and
enabling electric power boost when the state of charge of the energy storage device is greater than the threshold state of charge.

7. The method of claim 1, further comprising:
determining an engine state as a cylinder deactivation state; and
enabling electric power boost when the engine state is the cylinder deactivation state.

8. The method of claim 1, further comprising:
determining whether an engine torque is greater than a threshold torque; and
enabling electric power boost when the engine torque is greater than the threshold torque.

9. The method of claim 1, further comprising:
enabling electric power boost; and
increasing the electric power limit when the electric power boost is enabled.

10. The method of claim 9, wherein the electric power limit is ramped up over time at a calibrated ramp up rate when electric power boost is enabled.

11. The method of claim 1, further comprising:
disabling electric power boost; and
decreasing the electric power limit when the electric power boost is disabled.

12. The method of claim 11, wherein the electric power limit is ramped down over time at a calibrated ramp down rate based upon the output speed of the output member.

13. Method for managing electric power in a powertrain system comprising an energy storage device, an engine, a second torque generating device and a transmission device operative to transfer power among an output member, the engine and the second torque generating device, the second torque generating device electrically coupled to an energy storage device, the method comprising:
monitoring operating conditions of the powertrain system;
providing a maximum electric power limit and a minimum electric power limit;
selectively enabling and disabling electric power boost based on the operating conditions of the powertrain system; and
modifying the electric power limit by one of boosting the electric power limit when electric power boost is enabled and pinching the electric power limit when the electric power boost is disabled.

14. The method of claim 13, further comprising:
determining a set of output torque constraints based upon the electric power limit; and
determining an output torque of the output member based upon the output torque constraints.

15. The method of claim 13, further comprising:
monitoring operating conditions of the powertrain system including at least one of a state of charge of the energy storage device, an engine torque, an engine capacity limit, an engine state, an engine starting cycle operation, and an engine stopping cycle operation; and enabling electric power boost based upon at least one of the state of charge of the energy storage device, the engine state, the engine torque, the engine starting cycle, and the engine stopping cycle.

16. The method of claim 13, further comprising:

determining whether a state of charge of the energy storage device is greater than a threshold state of charge; and enabling electric power boost when the state of charge of the energy storage device is greater than the threshold state of charge.

17. The method of claim 13, further comprising:

determining an engine state as a cylinder deactivation state; and enabling electric power boost when the engine state is the cylinder deactivation state.

18. The method of claim 13, further comprising:

determining whether an input torque from an engine is greater than a threshold input torque; and enabling electric power boost when the input torque from the engine is greater than the threshold input torque.

19. The method of claim 13, further comprising:

enabling electric power boost; and increasing the electric power limit when the electric power boost is enabled, wherein the electric power limit is ramped up over time at a calibrated ramp up rate when electric power boost is enabled.

20. Method for managing electric power in a powertrain system comprising an energy storage device, an engine, a second torque generating device and a transmission device operative to transfer power among an output member, the engine and the second torque generating device, the second torque generating device electrically coupled to an energy storage device, the method comprising:

providing a maximum electric power limit and a minimum electric power limit;

monitoring operating conditions of the powertrain system including at least one of a state of charge of the energy storage device, an engine torque, an engine capacity limit, an engine state, an engine starting cycle operation, and an engine stopping cycle operation;

enabling electric power boost based upon at least one of the state of charge of the energy storage device, the engine state, the engine torque, the engine starting cycle, and the engine stopping cycle; and increasing the electric power limit when electric power boost is enabled.

* * * * *